Patented Aug. 19, 1947

2,426,015

UNITED STATES PATENT OFFICE 2,426,015

PREPARATION OF TERTIARY ETHERS

William E. Grigsby, Wilmington, Del., assignor to E. I. du Pont de Nemours & Company, Wilmington, Del., a corporation of Delaware No Drawing. Application August 19, 1944,
Serial No. 550,299

4 Claims. (Cl. 260—615)

This invention relates to the preparation of tertiary ethers, and particularly to the preparation of tertiary ethers in accordance with the following equation,

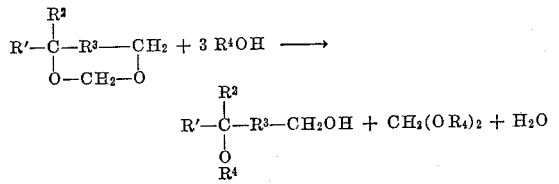

wherein R' and R² are alkyl groups, R³ is an alkylene radical, and R⁴ is a member selected from a class of methyl, ethyl, propyl and isopropyl groups.

It has been known heretofore, as disclosed in Sussman and Gresham U. S. Patent 2,340,907, that 1,3-dioxolanes may react with alcohols in the presence of acidic catalysts to yield certain alkoxyalkoxy aliphatic alcohols. For example, in accordance with the prior art, 1,3-dioxolanes were known to react with methanol to form methoxymethoxyethanols. Thus, in the normal alcoholysis of the glycol cyclic formal ring with methanol, one of the glycol hydroxyls became free, and the other became etherified with the methoxymethyl radical.

According to the present invention, cyclic formals of tertiary glycols react with the lower aliphatic alcohols under certain mild conditions hereinafter disclosed to give tertiary glycol monoalkyl ethers, i. e., the tertiary hydroxyl group becomes etherified by the alkyl radicals. As compared with the prior art, this involves an abnormal alcoholysis of the glycol cyclic formal ring. The alkoxymethoxyalkanol type of alcoholysis product is not obtained in appreciable quantity under these conditions, but instead the alcohol splits the ring so as to give a monoalkyl tertiary ether of the glycol, and a fragment which is readily removable as low-boiling formal.

By "tertiary glycol" is meant a glycol containing at least one tertiary hydroxyl group. Examples of tertiary glycol formals are: 4,4-dimethyl-1, 3-dioxane, 4,4-diethyl-1, 3-dioxane, 4-methyl-4-ethyl-1,3-dioxane and the like. These tertiary glycol cyclic formals may be prepared by treating tertiary olefines or tertiary alcohols with formaldehyde in the presence of an aqueous acid catalyst (cf. British Patent 483,828).

In the practice of this invention the tertiary glycol formal is preferably heated with a lower alcohol (methanol, ethanol, and/or the propanols) in the presence of an acid-reacting catalyst, and the corresponding dialkyl formal (methylal, diethyl formal, ethylmethyl formal, diisopropyl formal, dipropyl formal, etc.) is removed by distillation as the reaction proceeds. The formal fraction removed by distillation need not contain the formal exclusively, but may be an azeotropic mixture. For example, an n-propanol-di-n-propyl formal-water azeotrope, boiling at 86.4° is obtained when the alcohol employed in the alcoholysis is n-propanol. After removal of the dialkyl formal, the acidic catalyst is neutralized, or, alternatively, the mixture may be made alkaline, and excess alcohol is removed by distillation. Thereafter the tertiary glycol monoalkyl ether is separated from the residue, preferably by distillation at diminished pressure.

The reaction of the tertiary glycol cyclic formals with the aforesaid alcohols proceeds satisfactorily when about 0.1 to 10% (based on the weight of the cyclic formal) of the acid-reacting catalyst is employed. Suitable catalysts are mineral acids, such as sulfuric, phosphoric, toluene-sulphonic, hydrochloric, and the like. Generally, it is desirable to employ at least the stoichiometrically required amount of alcohol, preferably 3 or more moles of alcohol per mole of cyclic formal. The preferred temperature is about 40° to 90° C. The reaction is generally conducted at atmospheric pressure, although pressures somewhat higher or lower than atmospheric may be employed if desired.

The invention is illustrated further by means of the following example.

*Example.*—A mixture containing 348 grams of methanol, 232.3 grams 4,4-dimethyl-1,3-dioxane (B. P. 75° C./107 mm.) and 13.7 grams of sulfuric acid was heated in a distillation apparatus for five hours, during which time a methylal fraction was removed from the reaction mixture by distillation. When the formation of methylal ceased, the distillation residue was made basic with sodium methoxide, and the resultant basic product was distilled, yielding 83.2 grams of 3-methyl-3-methoxybutanol-1, boiling at 175° C. at 760 mm., or 75° C. at 18 mm. (Anal.: C, 61.85, 62.01%; H, 12.16, 12.09%; OCH₃, 25.6%; OH No. 450; $N_D^{26}$, 1.4250).

The products obtained in accordance with this invention have a wide range of applications, but they are of greatest interest as solvents, and as ingredients of hydraulic fluid and anti-freeze compositions. For example, 3-methyl-3-methoxy-butanol-1 has the remarkable property of remaining fluid over a temperature range of from below −80° C. to about 170° at atmospheric pressure.

The above example is illustrative only, and many different embodiments of the invention will occur to those skilled in the art. Accordingly, it will be understood that I do not limit myself, except as set forth in the following claims.

I claim:

1. A process for the synthesis of 3-methyl-3-methoxybutanol-1 which essentially consists in heating 4,4-dimethyl-1,3-dioxane with at least 3 moles of methanol per mole of 4,4-dimethyl-1,3-dioxane in the presence of an acid-reacting catalyst at a temperature of from 40° to 90° C. while distilling methylal from the reacting mixture, stopping the distillation when the formation of methylal ceases, thereafter making the resulting mixture alkaline and distilling 3-methyl-3-methoxybutanol-1 from the resultant alkaline residue.

2. A process for the synthesis of 3-methyl-3-methoxy-butanol-1 which comprises heating 4,4-dimethyl-1,3-dioxane with methanol in the proportion of at least 3 mols of methanol per mol of 4,4-dimethyl-1,3-dioxane, at a temperature of from 40° to 90° C., in the presence of an acid reacting catalyst while distilling methylal from the reacting mixture, stopping the distillation when the formation of methylal ceases, making the resulting mixture alkaline and thereafter distilling 3-methyl-3-methoxybutanol-1 from the resultant alkaline residue.

3. A process for the synthesis of 3-methyl-3-methoxybutanol-1 which comprises heating 4,4-dimethyl-1,3-dioxane with at least 3 mols of methanol per mol of 4,4-dimethyl-1,3-dioxane at a temperature of from 40° to 90° C. in the presence of from 0.1 to 10% of an acid reacting catalyst, based upon the weight of 4,4-dimethyl-1,3-dioxane, whereby methylal and 3-methyl-3-methoxybutanol-1 are produced, distilling the said methylal from the reaction mixture while the reaction is in progress, stopping the distillation when the formation of methylal ceases and thereafter making the resultant residue alkaline and separating 3-methyl-3-methoxybutanol-1 by distillation from the said alkaline residue.

4. A process for the synthesis of 3-methyl-3-methoxybutanol-1 which comprises heating 4,4-dimethyl-1,3-dioxane with at least 3 mols of methanol per mol of 4,4-dimethyl-1,3-dioxane at a temperature of from 40° to 90° C. in the presence of from about 0.1 to 10% of an acid reacting catalyst based on the weight of 4,4-dimethyl-1,3-dioxane, whereby methylal and 3-methyl-3-methoxybutanol-1 are produced, distilling the said methylal from the reaction mixture while the reaction is in progress, stopping the distillation when the formation of methylal ceases and thereafter neutralizing the resultant product and separating 3-methyl-3-methoxybutanol-1 by distillation from the said neutralized residue.

WILLIAM E. GRIGSBY.

REFERENCES CITED

The following references are of record in the file of this patent:

UNITED STATES PATENTS

| Number | Name | Date |
| --- | --- | --- |
| 1,968,032 | Edlund | July 31, 1934 |
| 2,337,057 | Mikeska | Dec. 21, 1943 |
| 2,340,907 | Sussman | Feb. 8, 1944 |

FOREIGN PATENTS

| Number | Country | Date |
| --- | --- | --- |
| 579,651 | Germany | June 29, 1933 |
| 599,836 | Germany | July 11, 1934 |

OTHER REFERENCES

Beilstein, "Handbuch der Organischen Chemie," 4th ed., vol. 1, supp. 2, p. 552.